May 26, 1925.

I. P. DUNCAN ET AL 1,539,245

WHIPPER

Filed July 30, 1924

INVENTORS
Israel P. Duncan
Thomas M. Gore
BY Westall and Wallace
ATTORNEYS

Patented May 26, 1925.

1,539,245

UNITED STATES PATENT OFFICE

ISRAEL P. DUNCAN AND THOMAS M. GORE, OF LOS ANGELES, CALIFORNIA.

WHIPPER.

Application filed July 30, 1924. Serial No. 729,075.

*To all whom it may concern:*

Be it known that we, ISRAEL P. DUNCAN and THOMAS M. GORE, citizens of the United States, and residents of Los Angeles, in the county of Los Angeles and State of California, have invented new and useful Improvements in Whippers, of which the following is a specification.

This invention relates to a whipper which is especially serviceable as a kitchen utensil for beating and mixing fluent material. The primary object of this invention is to provide a machine which has a current motor operable by a stream of water. Other objects of this invention are to provide an efficient, durable, economical, and compact machine, one which may be readily attached to and detached from an ordinary faucet, and is supported by the faucet during use. In addition to the broader objects of this invention, there are certain features of structure whereby a whipper suitable for use with any open bowl or vessel may be attained.

Figure 1:
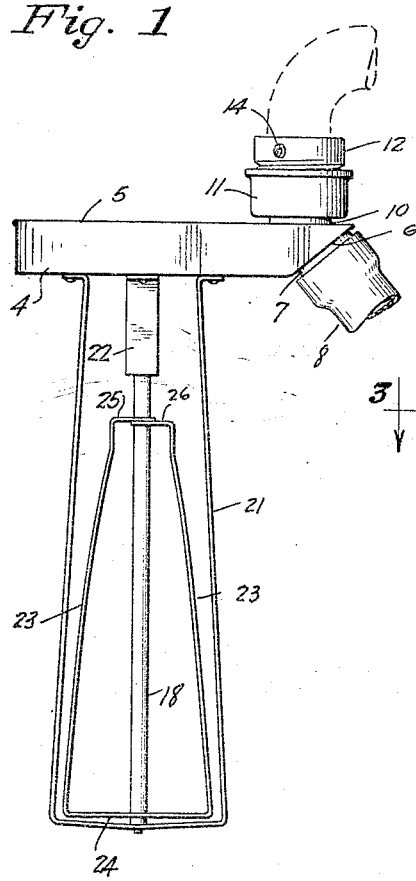
Figure 2:
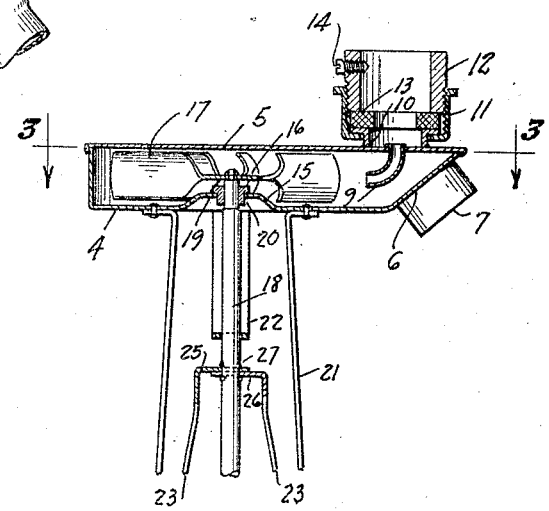
Figure 3:
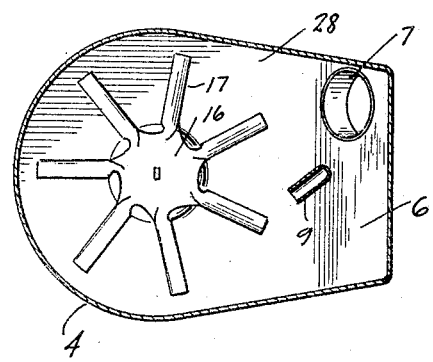

These objects together with other objects and corresponding accomplishments are obtained by means of the embodiment of our invention illustrated in the accompanying drawing, in which:

Fig. 1 is an elevation of a complete machine; Fig. 2 is a section of the upper end thereof; and Fig. 3 is a section as seen on the line 3—3 of Fig. 2.

Referring more particularly to the drawing, a motor housing preferably formed of stamped metal is comprised of a flanged bottom portion 4 having a cover 5. The housing is relatively thin and has a U-shape in a lateral direction. At the straight end the housing is bent at an angle as indicated by 6 to form an incline. At one side of the inclined portion is an outlet 7 adapted to have a hose 8 or other similar tubular member slipped thereon. Adjacent the straight edge portion at the center is a nozzle 9 directed inwardly away from the outlet and opening through the cover. On the outside of the cover concentric with the nozzle opening is a tubular outwardly flanged coupling member 10. A sleeve 11 is fitted over the tubular extension 10 and is internally threaded. Disposed in the sleeve is an adapter 12 to fit over a water bib indicated in dotted lines in Fig. 1. Interposed between the bushing and the member 10 is a gasket or washer 13 of rubber or like material to provide a leak tight fit between the bib and casing. A set screw 14 is mounted in the adapter and is pointed to provide for engagement with the bib and to support the housing in position thereon. The lower face of the casing is indented as indicated by 15 and provided with a bore through which the whipper shaft may extend.

Disposed within the casing is an impeller 16. The impeller is preferably formed from a sheet of metal which is cut and stamped to provide outwardly extending vanes 17 with the concave sides thereof facing the nozzle outlet 9. The impeller is secured to the upper end of the shaft 18, thrust collars 19 and 20 being secured to the shaft and on opposite sides of the cover 4.

A yoke 21 consisting of a bar bent to form a loop and secured to the housing 4 is provided at the lower end with an opening serving as a bearing for the other end of beater shaft 18. A yoke 22 of similar form but shorter is secured to the housing and is disposed in a plane at right angles to the plane of yoke 21. Yoke 22 serves as a bearing for the upper end of shaft 18. The beater consists of a bar of resilient metal 23 bent to form a closed loop, having side arms 23 and a cross portion 24 at the bottom provided with an opening through which the shaft 18 extends. The beater bar is provided with bores at the overlapped ends as indicated by 25 and 26, the stock of the shaft then being upset as indicated by 27 to hold the beater in position upon the shaft. The beater is secured to the shaft so as to be rotated therewith.

The machine is secured to a water bib as indicated in Fig. 1. Water enters and passes through the nozzle 9 being projected against the vanes 17 of the water wheel causing the latter to rotate and rotate the beater. The water as it fills the housing is confined to movement in the direction of rotation of the water wheel following the casing and leaving the periphery of the wheel at the point 28, following the outer wall and passing outwardly through the discharge 7. Any water which may crowd into the discharge end of the casing will pass upwardly over the inclined face to the discharge outlet. This effectively rids the casing of the spent water and prevents interference with the water wheel. The position of the inlet at the median line balances the machine so as to do away with any detrimental vibration.

What we claim is:

1. In a whipper, the combination of an impeller wheel, a horizontally extended vertically thin housing therefor having a rounded impeller chamber at one end corresponding in curvature to said impeller wheel and extended at the opposite end to form an inlet and outlet water chamber beyond said impeller, the lower face of said housing being inclined toward the upper face at the water chamber end thereof, the inclined portion of the lower face having an outlet at one side, an inlet coupling disposed at the median line of said housing in the upper face thereof and having a nozzle extending therefrom and directed toward the other side of said housing.

2. In a whipper, the combination of an impeller wheel, a horizontally extended vertically thin housing therefor having a rounded impeller chamber at one end corresponding in curvature to said impeller wheel and extended at the opposite end to form an inlet and outlet water chamber beyond said impeller, the impeller chamber closely embracing the sides of said impeller, the upper and lower faces of said housing converging at the water chamber end thereof, said housing having an outlet at one side of the water chamber, an inlet coupling disposed on a median line of said housing in the upper face thereof at the water end and having a nozzle extending therefrom and directed away from said outlet toward the periphery of said impeller.

3. In a whipper, the combination of an impeller wheel, a horizontally extended vertically thin housing therefor having a rounded impeller chamber at one end corresponding in curvature to said impeller wheel and extended at the opposite end to form an inlet and outlet water chamber beyond said impeller, the lower face of said housing being inclined toward the upper face at the water chamber end thereof, said housing having an outlet adjacent one side of said water chamber in the inclined portion thereof and an inlet in the upper face of said housing at the chamber end adjacent said outlet having a nozzle extending therefrom and directed away from said outlet toward said impeller.

In witness that we claim the foregoing we have hereunto subscribed our names this 21st day of July, 1924.

ISRAEL P. DUNCAN.
THOMAS M. GORE.